United States Patent [19]

Coffman

[11] 4,127,180
[45] Nov. 28, 1978

[54] TRACK VEHICLE WHEEL MOUNT AND ADJUSTMENT

[75] Inventor: Allen B. Coffman, Greencastle, Pa.

[73] Assignee: JLG Industries, Inc., McConnellsburg, Pa.

[21] Appl. No.: 771,106

[22] Filed: Feb. 23, 1977

[51] Int. Cl.² .......................................... B62D 11/00
[52] U.S. Cl. ..................................... 180/6.48; 305/10
[58] Field of Search ................. 305/10, 22, 31, 32; 180/6.48, 6.5, 9.42

[56] References Cited

U.S. PATENT DOCUMENTS

| | | | |
|---|---|---|---|
| 2,683,064 | 7/1954 | Land | 305/9 |
| 2,716,577 | 8/1955 | Land | 305/9 |
| 2,828,170 | 3/1958 | Badgley | 91/432 |
| 3,008,772 | 11/1961 | Helsel | 305/10 |
| 3,161,418 | 12/1964 | Brennan | 305/32 |
| 3,190,384 | 6/1965 | Dufresne | 180/6.7 |
| 3,645,349 | 2/1972 | Nichter | 180/6.48 |
| 3,907,382 | 9/1975 | Kessinger | 305/10 |

FOREIGN PATENT DOCUMENTS 1,095,681  12/1960  Fed. Rep. of Germany ............ 305/10

Primary Examiner—Joseph F. Peters, Jr.
Assistant Examiner—John A. Carroll
Attorney, Agent, or Firm—Irvin A. Lavine

[57] ABSTRACT

A tracked vehicle has four pneumatic tires each driven by a hydraulic motor drivingly connected to a torque hub. A drive motor, torque hub and wheel are supported by a motor mount assembly which includes a pair of transverse channels, connected at their outer ends to a hub mount plate and at their inner ends to a slide plate. The slide plate is in planar engagement with a chassis plate, and is releasably held to the chassis plate by a pair of linearly extending rail guides bolted to the chassis plate and providing with the chassis plate a guideway in which the slide plate is movable. A hydraulic motor engages a channel of the motor mount, and has its piston rod pivotally attached to an abutment anchored to the chassis plate.

14 Claims, 2 Drawing Figures

TRACK VEHICLE WHEEL MOUNT AND ADJUSTMENT

BACKGROUND OF THE INVENTION

The present invention relates to a track vehicle construction in which a wheel is carried by a hub and motor assembly which is supported by a mount assembly that is adjustable, for varying track tension as required.

Vehicles have been provided with tracks which extend around at least two wheels or sprockets which are carried by the chassis of the vehicle, usually on suitable bearings. After a period of use, it has been recognized that the track tends to lengthen, and thereby in order to maintain proper tension of the track, various constructions have been utilized for enabling the track to be tensioned, so that there is less danger of the track separating or coming off of the wheels. In a number of instances, one of the wheels has been mounted on a bearing which is movably mounted on the chassis of the vehicle, there being provided a hydraulic shift motor which is utilized to shift the movable wheel away from the other wheel, so as to in effect lengthen the distance between the axles and thereby increase track tension as necessary. In addition, there have been provided constructions in which the adjustment secured is maintained either by the hydraulic cylinder, or by a separate mechanical arrangement. In the latter constructions, the hydraulic shift cylinder is used only for obtaining the desired position of the wheel and the consequent track tension adjustment, and the position of the wheel is then maintained by a mechanical lock.

In one known construction, for example, a separate track frame was provided, supported from the main chassis of the vehicle, and this separate track frame included longitudinally extending upper and lower guides. The bearing of the non-driven wheel was supported in these guides, and the axle of the non-driven wheel was carried in the bearing. A thrust rod was provided, having one end engaging the bearing and the other end serving as a piston in a hydraulic shift motor, the cylinder of the hydraulic shift motor being bifurcated, and clamp means were provided to selectively clamp the bifurcated ends of the hydraulic shift cylinder to the piston portion of the thrust rod, to thereby secure the desired adjustment position of the wheel bearing and axle. This construction, therefore, required a separate track frame, and therefore was both heavy and expensive and not suitable for lighter weight tracked vehicles.

A similar construction including a separate track frame was provided in another known apparatus, the distinction being in the specific mechanical locking arrangement, in this construction there being provided teeth on the piston of the shift motor, with the shift motor cylinder having an opening in which was inserted a toothed locking plate which could be secured in the locked position by nuts and bolts forcing it inwardly against the toothed piston rod, or, selectively, permitting the toothed locking plate to be disengaged from the piston rod to permit movement of it. This construction was deficient for the same reasons as the construction above discussed, and additionally permitted only set-by-step adjustment, and not unlimited adjustment.

In yet another disclosure of the prior art, a somewhat different locking arrangement was provided being characterized by a piston rod having grooves transverse to the longitudinal axis of it, there being provided a horseshoe-shaped locking member which could be inserted into one or another of the grooves, and which could engage the end of the cylinder of the the shift motor, so as to lock the shift motor in the desired position.

These noted constructions, while providing suitable strength, usually by the utilization, of an additional track frame, were deficient in requiring a heavy construction, with an auxiliary track frame, and also in not providing for a construction in which the wheel subject to adjustment would be a driving wheel.

SUMMARY OF THE INVENTION

A tracked vehicle is provided having at least a pair of wheels with a track on them, the wheels being carried by a hub and motor assembly, which is in turn carried by a mount assembly that is carried directly by a planar chassis plate. A pair of spaced, parallel rails are mounted on the planar chassis plate, each rail having a flange in spaced, parallel relationship to the chassis plate. The mount assembly includes a slide plate which is in planar engagement with the chassis plate, and having edge portions located between the flanges of the rails and the chassis plate. This edge portion is at least as thick as the spacing between the rail flanges and the chassis plate. Screws are provided to selectively lock the slide plate in a selected position, or to release it, for sliding movement, to effect thereby movement of the mount assembly, the wheel and hub assembly, and the wheel carried thereby. The screws extend through the rails, and are threaded into the chassis plate, so that when the screws are tightened, the slide plate is clamped between the rail flange and the chassis plate and is thereby immovable. A shift motor in the form of a linear hydraulic motor is provided, having the cylinder thereof seated in an annular projection carried by the mount assembly, and having an eye on the free end of the piston thereof, the eye being in bearing relationship with a pin that is anchored to the chassis plate.

The construction of the present invention does not require a separate track frame, but economically provides for the mounting of the wheel and hub assembly and the mount assembly directly to the chassis; the chassis itself is comprised of simple and inexpensive flat plate construction. The planar engagement between the slide plate and the chassis plate provides a strong mounting of the wheel to the chassis, so as to resist twisting movement of the wheel and axle, while achieving a mounting for a wheel and hub assembly and associated drive motor, so that the construction provides economy, simplicity, with strength and the ability to have both a driven wheel with associated motor and adjustment of the position of the entire mount assembly for track tension adjustment.

DESCRIPTION OF THE PREFERRED EMBODIMENT

Figure 1:
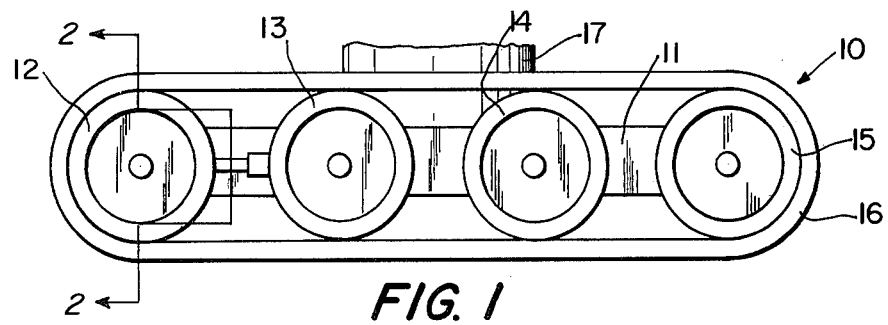
FIG. 1 is an elevational view of the track portion of a tracked vehicle in accordance with the present invention.

Referring now to the drawings, wherein like or corresponding reference numerals are used to designate like or corresponding parts throughout the several views, there is shown in FIG. 1 a portion of a tracked vehicle 10, which includes a chassis 11 which supports the wheels 12, 13, 14 and 15. In the preferred form, the wheels 12 and 15 are drive wheels, and the wheels 13 and 14 are idlers. The wheels are in the form of pneumatic tires, mounted on suitable hubs. A track 16 is on and in engagement with the wheels 12–15. There may be seen, as part of the vehicle 10, a superstructure 17, shown broken away, but which may include, for example, a rotatable upper works, such as is provided in cranes and similar structures. The upper works (not shown) include a source of power, such as an internal combustion engine, which drives a pump, the pump being connected through suitable fluid lines to four drive motors, one positioned at each of the wheels 12 and 15, and at the corresponding wheels of the vehicle on the side opposite that which is seen in FIG. 1.

Figure 2:
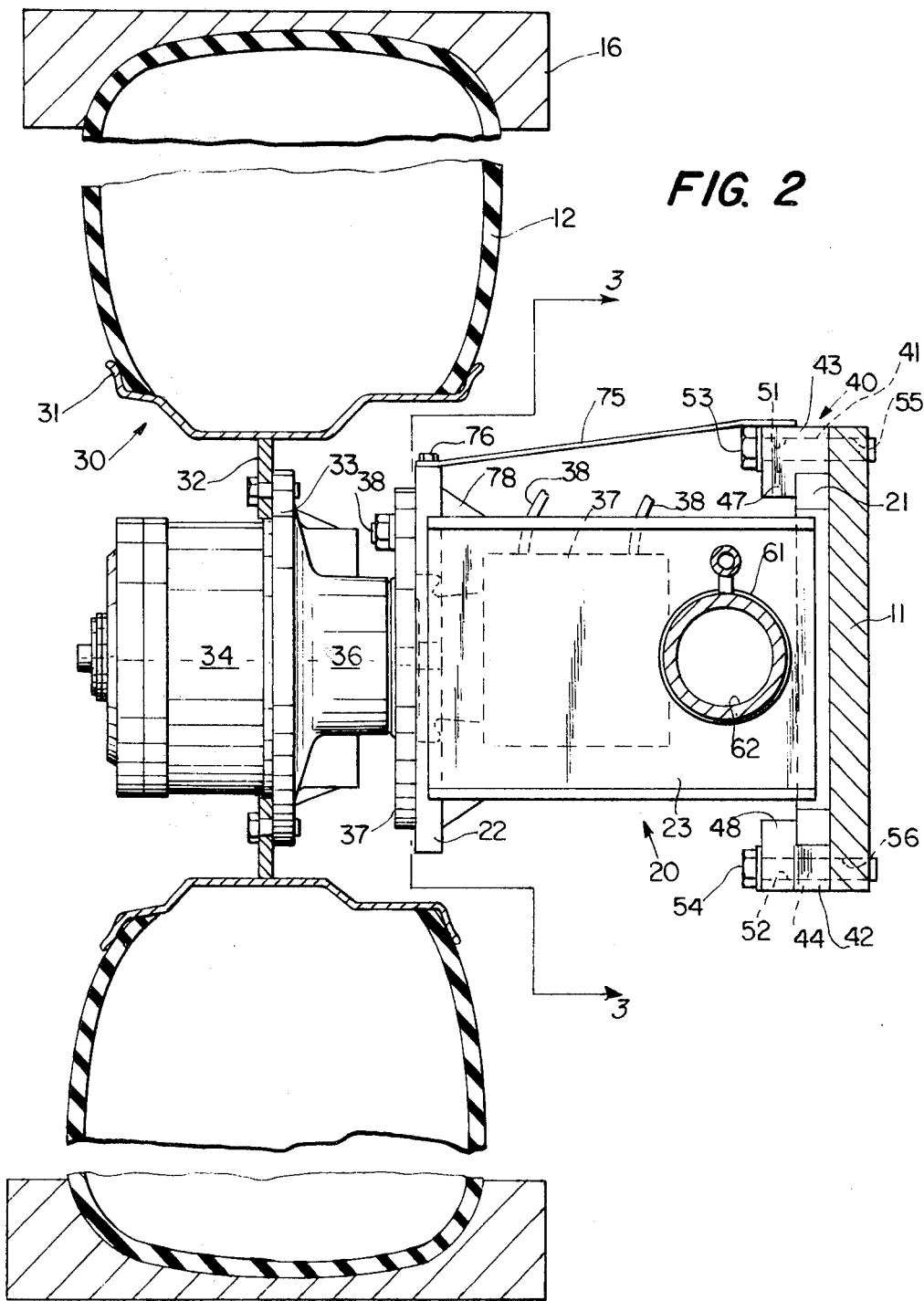
FIG. 2 is a cross sectional view taken generally on the line 2—2 of FIG. 1.

Referring now to FIG. 2, there may be seen the chassis 11, in the form of a plate or slab extending principally in a vertical plane. Adjacent the chassis plate 11 is a mount assembly, generally designated 20, and including a slide plate 21 which is generally planar, and is in face-to-face engagement with the chassis plate 11. The mount assembly 20 includes a hub mount plate 22, which is in spaced, parallel relationship to the slide plate 21. Completing the mount assembly are a pair of channels 23 and 24 (see FIG. 3), the channels 23 and 24 being in spaced parallel relationship. Preferably, the channel 23 is welded at one end to the slide plate 21 and at the other end to the hub mount plate 22, and the channel 24 is similarly assembled to the slide plate 21 and hub mount plate 22. As is seen in FIG. 3, the channels 23 and 24 are spaced apart, so as to provide a space between them.

A wheel and hub assembly, generally designated 30, includes the aforementioned pneumatic tire 12, which is mounted on the rim 31, in conventional fashion. Rim 31 is supported by a wheel disk 32, and wheel disk 32 is bolted to a flange 33 formed on a torque hub 34. Torque hub 34 has an extension 36, with a flange 37, which latter is secured to the hub mount plate 22 by suitable bolts, such as the bolt 38. The torque hub 34 has mounted on the extension 36 a rotary hydraulic drive motor 37, having conduits 38, connected to it, and to the aforementioned engine-driven pump (not shown). Details of the torque hub 34 and rotary hydraulic drive motor 37 are well known, and are not shown herein. As will be understood, however, energy from the internal combustion engine or other prime mover is used to drive the pump, which drives the rotary motor 37, thereby driving the wheel 12 through the torque hub 34. The rotary drive motor 37, which is one of four of such motors in the present vehicle, is positioned in the space between the two channels 23 and 24.

To support the slide plate 21, and thereby the entire mount assembly 20 and wheel assembly 30, there is provided the support structure generally designated 40, and including a pair of rails 41 and 42. Each includes a base portion 43, 44 and a flange portion 47, 48. The flange portions 47 and 48 are in spaced relationship to the chassis plate 11, and the upper and lower edge portions of the slide plate 21 are located between the flange portions 47 and 48 on the one hand and the chassis plate 11 on the other hand. The upper and lower edge portions of the slide plate 21 have a thickness which is at least equal to the space between the flange portions 47 and 48 and the chassis plate 11.

Figure 3:
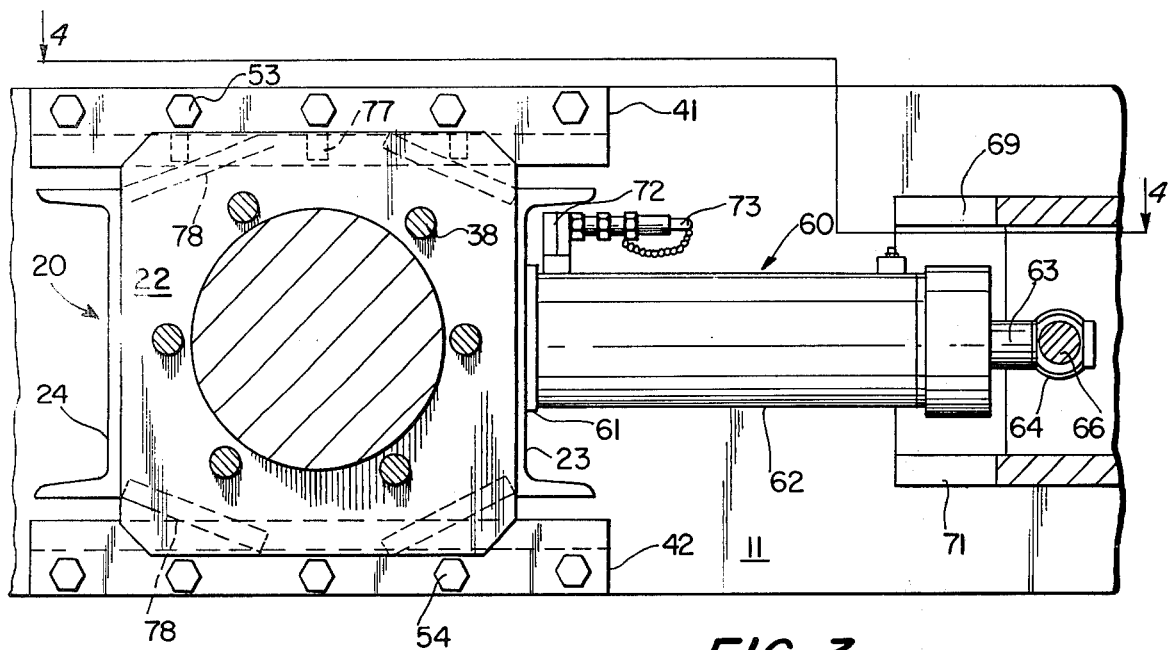
FIG. 3 is a cross sectional view taken on the line 3—3 of FIG. 2, with parts removed.

As may be seen in FIG. 3, the upper rail 41 and the lower rail 42 are linearly extending, in parallel relationship. Referring again to FIG. 2, the rails 41 and 42 are provided with a series of bores 51, 52, through which pass screws 53 and 54. The chassis plate 11 is provided with a series of threaded holes 55 and 56, and the screws 53 and 54 are threaded into these threaded holes 55 and 56 in the chassis plate 11. The screws 53 and 54 may be unloosened, so as to permit sliding of the slide plate 21 in the support structure provided by the rails 41 and 42: when the screws 53 and 54 are tightened, the slide plate 21 is thereby clamped in fixed position, between the flanges 47 and 48 of the rails 41 and 42, on the one hand, and the planar chassis plate 11, due to the relationship of the thickness of the edge portions of the slide plate 21 to the spacing of the flanges 47 and 48 from the chassis plate 11. As will be understood, it is preferred, for purposes of economy, to make the slide plate 21 of uniform thickness.

On the web of the channel 23 there is provided a seat 61, in the form of a protruding ring, the ring 61 having an inner diameter which is sized to receive the cylinder 62 of a hydraulic shift motor 60. Shift motor 60 is seen, also, in FIGS. 3 and 4, to which reference is now made. Reference to FIG. 3, the shift motor 60 is seen to be a linear hydraulic motor, including the cylinder 62, a piston (not shown) and a piston rod 63 which terminates in an eye configuration 64. A pin 66 extends through the eye 64 of piston rod 63 in bearing relationship thereto, pin 66 being supported by a pair of support plates 67 and 68 which are in spaced, parallel relationship. The support plates 67 and 68 are, in turn, carried by a pair of anchor plates 69 and 71, of generally triangular configuration, and which are in spaced apart and parallel relationship, being secured to the chassis plate 11 by welding.

Figure 4:
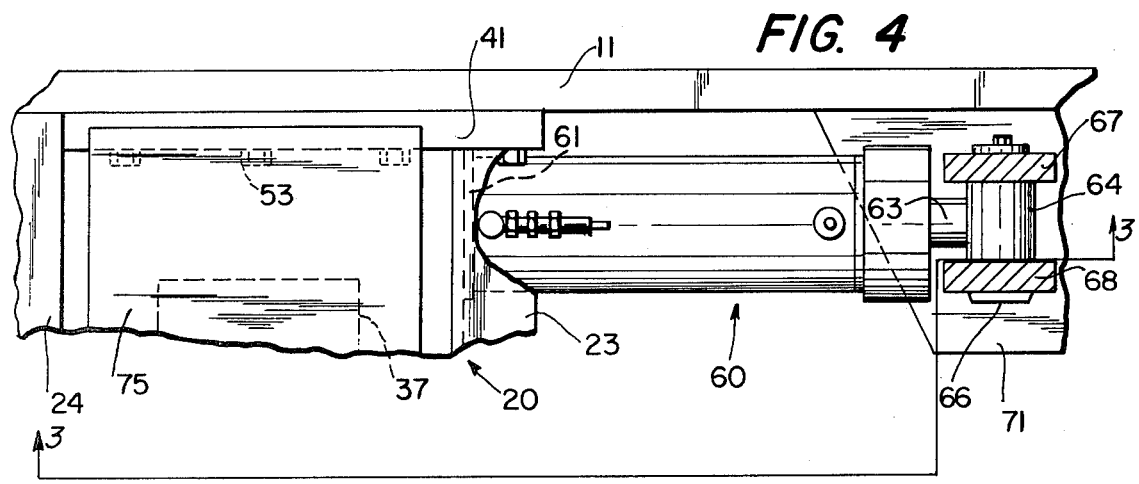
FIG. 4 is a view, partly in section, taken on the line 4—4 of FIG. 3.

The hydraulic cylinder 60 is provided with a suitable fitting 72 for connection to a conduit 73, so that a suitable fluid material, such as lubricant, may be introduced into the shift motor 60 in order to move the entire mount assembly 20 to the left as shown in FIGS. 1, 3 and 4.

Referring again to FIG. 2, there may be seen a shield, generally designated 75, secured by bolts 76 to the hub mount plate 22, shield 75 extending over the screws 53, and partly over the upper rail 41. In FIG. 3, the shield 75 has been removed for clarity, there being indicated holes 77 in the hub mount plate 22 for receiving the screws 76. The cover is shown in FIG. 4. Also shown in FIG. 3 are the bolts 38 which secure the torque hub flange 37 to the hub mount flange 22. There may be provided stiffening plates 78 which extend between the hub mount plate 22 and the channels 23 and 24, as shown in FIGS. 2 and 3, in order to provide additional strength to the mount assembly 20.

The tension of the track 16 is adjusted by unloosening the screws 53 and 54, thereby removing the clamping force from the slide plate 21. Then suitable fluid material is supplied to the shift motor 60, causing it to shift the entire mount assembly 20, and wheel and hub assembly 30 to the left as shown in FIGS. 1, 3 and 4, in order to increase track tension. Once the desired track tension is obtained, the screws 53 and 54 are again tightened, in order to clamp the slide plate 21 in the thus obtained position. As will be understood, the safety cover 75 may be removed for easy access to the heads of the screws 53.

Due to the planar engagement of the slide plate 21 with the chassis plate 11, great strength is provided for the wheel, so as to prevent it from twisting or moving out of the plane in which it is positioned. The mount assembly 20 is of strong construction, providing both a mounting support for the wheel and hub assembly 30 and a space for the drive motor 37. Further, due to the eye and pin construction on the one hand, and the seat for the cylinder of shift motor 60 on the other hand, engagement of shift motor 60 with the mount assembly 20 is maintained, with resistance of movement of the shift motor 60 transversely of the axis thereof, the pin and eye connection of the piston rod to the fixed structure providing necessary flexure.

It will be obvious to those skilled in the art that various changes may be made without departing from the spirit of the invention, and therefore the invention is not limited to what is shown in the drawings and described in the specification but only as indicated in the appended claims.

I claim:

1. Apparatus for adjustably mounting a driving wheel and support of a track vehicle comprising:
   a generally planar chassis plate,
   a mount assembly comprising:
      a slide plate in planar engagement with said chassis plate,
      a hub mount plate in spaced relation to said slide plate,
      means connecting said slide plate to said hub mount plate,
      a wheel and hub assembly having the hub thereof secured to said hub mount plate,
      a drive motor between said slide plate and said hub mount plate and drivingly connected to said wheel and hub assembly,
   means for supporting said slide plate in planar engagement with said chassis plate and for selectively permitting or preventing movement of said side plate relative to said chassis plate, and
   means for moving said slide plate relative to said chassis plate for adjusting tension of a track encompassing said wheel.

2. The apparatus of claim 1, said means for moving said slide plate comprising a hydraulic shift motor, an abutment anchored to said chassis plate and having said shift motor secured thereto, said shift motor abutting said mount assembly and extending generally parallel to said chassis plate.

3. The apparatus of claim 2, said abutment comprising a pin, said shift motor including a piston rod having an eye on the free end thereof in bearing relationship with said pin.

4. The apparatus of claim 2, wherein said shift motor abuts said means connecting said slide plate to said hub mount plate.

5. The apparatus of claim 4, wherein said means connecting said slide plate to said hub mount plate comprises means providing a seat for said motor for preventing transverse movement of said shift motor.

6. The apparatus of claim 5, said last mentioned means being annular.

7. The apparatus of claim 1, wherein said means for supporting said slide plate comprises rail means extending along said chassis plate, and means for releasably securing said rail means to said chassis plate.

8. The apparatus of claim 7, said rail means comprising a pair of spaced, parallel rails, each having a flange in spaced parallel relation to said chassis plate.

9. The apparatus of claim 8, wherein each said flange engages one side of said slide plate, the other side of said slide plate engaging said chassis plate.

10. The apparatus of claim 9, wherein said means for selectively permitting or preventing movement of said slide plate comprises screw means extending into said rails.

11. The apparatus of claim 10, said screw means extending through said rails and threaded into threaded holes in said chassis plate.

12. The apparatus of claim 1, said means for supporting said slide plate and for selectively permitting or preventing movement of said slide plate comprising a pair of rails in spaced parallel relationship, each including a base adjacent said chassis plate and a flange extending in spaced parallel relation to said chassis plate, said slide plate being between said flanges and said chassis plate.

13. The apparatus of claim 12, wherein said slide plate in the region thereof between said rail flanges and said chassis plate is slightly thicker than the space between said rail flanges and said chassis plate, and wherein screws extend through said rails and into said chassis plate to effect selectively clamping of said slide plate between said rail flanges and said chassis plate.

14. The apparatus of claim 13, wherein said chassis plate is provided with a series of threaded holes, said screws being threaded into said holes.

* * * * *